United States Patent
Rice et al.

(10) Patent No.: US 9,587,749 B2
(45) Date of Patent: Mar. 7, 2017

(54) SLIT VALVE WITH A PRESSURIZED GAS BEARING

(71) Applicant: Applied Materials Israel, Ltd., Rehovot (IL)

(72) Inventors: Michael R. Rice, Pleasanton, CA (US); Natan Schlimoff, Rehovot (IL); Igor Krivts (Krayvitz), Rehovot (IL); Israel Avneri, Ramat-Gan (IL); Yoram Uziel, Post Misgav (IL); Erez Admoni, Petach-Tikva (IL); Paul Reuter, Austin, TX (US); William (Ty) Weaver, Austin, TX (US)

(73) Assignee: Applied Materials Israel, Ltd., Rehovot (IL)

( * ) Notice: Subject to any disclaimer, the term of this patent is extended or adjusted under 35 U.S.C. 154(b) by 96 days.

(21) Appl. No.: 14/456,258

(22) Filed: Aug. 11, 2014

(65) Prior Publication Data
US 2015/0075659 A1   Mar. 19, 2015

Related U.S. Application Data

(60) Provisional application No. 61/865,129, filed on Aug. 12, 2013.

(51) Int. Cl.
| | |
|---|---|
| *F16K 3/00* | (2006.01) |
| *F16K 25/00* | (2006.01) |
| *F16K 3/02* | (2006.01) |
| *F16K 39/04* | (2006.01) |
| *F16K 25/02* | (2006.01) |
| *F16K 51/02* | (2006.01) |
| *F16K 3/18* | (2006.01) |

(52) U.S. Cl.
CPC ........ *F16K 3/0236* (2013.01); *F16K 3/0227* (2013.01); *F16K 3/188* (2013.01);
(Continued)

(58) Field of Classification Search
CPC . F16K 51/02; F16K 3/36; F16K 15/00; F16K 39/00; F16K 25/02; F16K 3/0227;
(Continued)

(56) References Cited

U.S. PATENT DOCUMENTS

| | | | | |
|---|---|---|---|---|
| 3,071,384 A | * | 1/1963 | Friberg | F01D 11/04 277/430 |
| 4,191,385 A | * | 3/1980 | Fox | F16C 29/025 277/432 |

(Continued)

*Primary Examiner* — Mary McManmon
*Assistant Examiner* — Hailey K Do
(74) *Attorney, Agent, or Firm* — Kilpatrick Townsend & Stockton LLP

(57) ABSTRACT

There is provided a slit valve, comprising: a first slit valve portion having a first window therethrough, the first window is sized to permit passage of an object through the first window; wherein the first window is surrounded by a first area of the first slit valve portion; a second slit valve portion that comprises a first sealing element and a first positioning module; wherein the first positioning module is arranged to move the first sealing element in relation to the first window; wherein at least one slit valve portion of the first and second slit valve portions comprises at least one first gas opening for emitting pressurized gas so as to assist in a creation of a first gas cushion between the first area and the first sealing element when the first sealing element is placed adjacent to the first window thus creating a seal between the first and second slit valve portions.

16 Claims, 12 Drawing Sheets

(52) U.S. Cl.
CPC .............. *F16K 25/02* (2013.01); *F16K 39/04* (2013.01); *F16K 51/02* (2013.01); *Y10T 137/877* (2015.04)

(58) Field of Classification Search
CPC ......... Y10T 137/4259; Y10T 137/4358; F16C 33/748
USPC ....... 251/195–206, 193, 194, 300, 301, 326, 251/328, 329; 277/411, 347, 913, 431, 277/432
See application file for complete search history.

(56) References Cited

U.S. PATENT DOCUMENTS

| | | | | |
|---|---|---|---|---|
| 4,229,655 A * | 10/1980 | Ryding | ................... | H01J 37/18 250/400 |
| 4,245,844 A * | 1/1981 | Pohl | ........................ | F16C 32/06 277/432 |
| 4,361,332 A * | 11/1982 | Logan | .................... | F16J 15/342 277/431 |
| 6,056,267 A * | 5/2000 | Schneider | ............... | F16K 3/184 251/193 |
| 6,443,618 B1 * | 9/2002 | Nishikawa | ............ | F16C 29/025 277/351 |
| 7,494,107 B2 * | 2/2009 | Sheydayi | ................ | F16K 51/02 251/175 |
| 7,754,014 B2 * | 7/2010 | Gochberg | ......... | H01L 21/67126 118/715 |
| 7,806,383 B2 * | 10/2010 | Tran | .................. | H01L 21/67126 251/175 |
| 8,011,381 B2 * | 9/2011 | Newman | ........... | H01L 21/67126 137/240 |
| 8,960,641 B2 * | 2/2015 | Blecha | ...................... | F16K 3/18 251/158 |
| 2014/0252720 A1 * | 9/2014 | Mitchell | ................ | F16J 15/443 277/305 |

\* cited by examiner

SLIT VALVE WITH A PRESSURIZED GAS BEARING

CROSS-REFERENCES TO RELATED APPLICATIONS

The present application claims priority to U.S. Provisional Patent Application No. 61/865,129, filed Aug. 12, 2013. The contents of this application are hereby incorporated by reference.

FIELD OF THE INVENTION

Slit valves and processing systems that include at least one chamber.

BACKGROUND OF THE INVENTION

Slit valves may be used as interfaces between different chambers of semiconductor substrates.

Slit valves are required to selectively seal windows formed in the different chambers without contaminating these different chambers. In addition, these slit valves are required to exhibit maximum resistance from dynamic mechanical wear and chemical attack.

Conventional slit valves have elastic O-shaped rings that seal gaps between parts of the slit valves. These O-shaped rings may contaminate any chamber in which they are positioned. In addition, O-shaped rings that are expected to operate at high temperature environments are very costly.

There is a growing need to provide low contamination and effective sealing solutions.

BRIEF SUMMARY OF THE INVENTION

According to an embodiment of the invention, there is provided a slit valve, comprising: a first slit valve portion having a first window therethrough, the first window is sized to permit passage of an object through the first window; wherein the first window is surrounded by a first area of the first slit valve portion; a second slit valve portion that comprises a first sealing element and a first positioning module; wherein the first positioning module is arranged to move the first sealing element in relation to the first window; wherein at least one slit valve portion of the first and second slit valve portions comprises at least one first gas opening for emitting pressurized gas so as to assist in a creation of a first gas cushion between the first area and the first sealing element when the first sealing element is placed adjacent to the first window thus creating a seal between the first and second slit valve portions. According to an embodiment of the invention, the chamber wall first slit valve portion includes the gas openings. According to another embodiment of the invention, the gas openings are provided within the seal element. According to an embodiment of the invention, one or more slit valve portions of the first and second slit valve portions comprises at least one first vacuum opening for sucking at least a portion of the pressurized gas so as to assist in a prevention of a propagation of the pressurized gas outside a vicinity of the first and second slit valve portions. According to an embodiment of the invention, the Slit valve may include vacuum openings for reducing the propagation of the pressurized gas outside the slit valve. According to yet another embodiment of the invention, one or more slit valve portions of the first and second slit valve portions comprises a first group and a second group of first vacuum openings for sucking at least a portion of the pressurized gas so as to reduce a propagation of the pressurized gas outside a vicinity of the first and second slit valve portions; wherein the first gas opening is positioned between the first and second groups of the first vacuum openings (e.g. Air bearing between vacuum grooves). According to an embodiment of the invention, the first group of first vacuum openings is positioned between the at least one first gas opening and the first window (e.g. Vacuum grooves between window and first gas opening). According to an embodiment of the invention, one or more slit valve portions of the first and second slit valve portions comprises multiple first vacuum openings for applying a differential pressure sucking scheme for sucking at least a portion of the pressurized gas so as to assist in a prevention of a propagation of the pressurized gas outside a vicinity of the first and second slit valve portions. According to an embodiment of the invention, the first sealing plate comprises the at least one first gas opening for emitting pressurized gas (e.g. sealing plate has gas openings). According to an embodiment of the invention, the at least one first gas opening comprises a first gas groove that surrounds the window. According to an embodiment of the invention, the at least one gas opening comprises multiple grooves that are spaced apart from each other, each groove surrounds the window. According to an embodiment of the invention, the slit valve further comprises sealing elements for sealing at least one portion of the positioning module. According to an embodiment of the invention, the first slit valve portion is integrated with a sidewall of an object processing chamber. According to an embodiment of the invention, the slit valve further comprises a third slit valve portion having a second window therethrough, the second window is sized to permit passage of the object through the second window; wherein the second window is surrounded by a second area of the third slit valve portion; a fourth slit valve portion that comprises a second sealing element and a second positioning module; wherein the second positioning module is arranged to move the second sealing element in relation to the second window; and wherein the slit valve is arranged to seal the second window with the second sealing element. According to an embodiment of the invention, the at least one slit valve portion of the third and fourth slit valve portions comprises at least one second gas opening for emitting another pressurized gas so as to assist in a creation of a second gas cushion between the second area and the second sealing element when the second sealing element is placed adjacent to the second window thus creating a seal between the third and fourth slit valve portions. According to an embodiment of the invention, the one or more slit valve portions of the third and fourth slit valve portions comprises at least one second vacuum opening for sucking at least a portion of the other pressurized gas so as to assist in a prevention of a propagation of the other pressurized gas outside a vicinity of the second and third slit valve portions.

According to an embodiment of the invention, there is provided an processing system, comprising: a first chamber, comprising a first chamber wall defining a first window therethrough, the first window is sized to permit passage of an object through the first window; wherein the first window is surrounded by a first area of the first chamber wall; a slit valve portion that comprises a first sealing element and a first positioning module; wherein the first positioning module is arranged to move the first sealing element in relation to the first window; wherein at least one of the first chamber wall and the slit valve portion comprises at least one first gas opening for emitting pressurized gas so as to assist in a creation of a first gas cushion between the first area and the first sealing element when the first sealing element is placed adjacent to the first window thus creating a seal between the first chamber wall and the slit valve portion. According to an embodiment of the invention, the object processing system further comprises: a second chamber, comprising a second chamber wall defining a second window therethrough, the second window is sized to permit passage of an object through the second window; wherein the second window is surrounded by a second area of the second chamber wall; another slit valve portion that comprises a second sealing element and a second positioning module; wherein the second positioning module is arranged to move the second sealing element in relation to the second window.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

Figure 1:
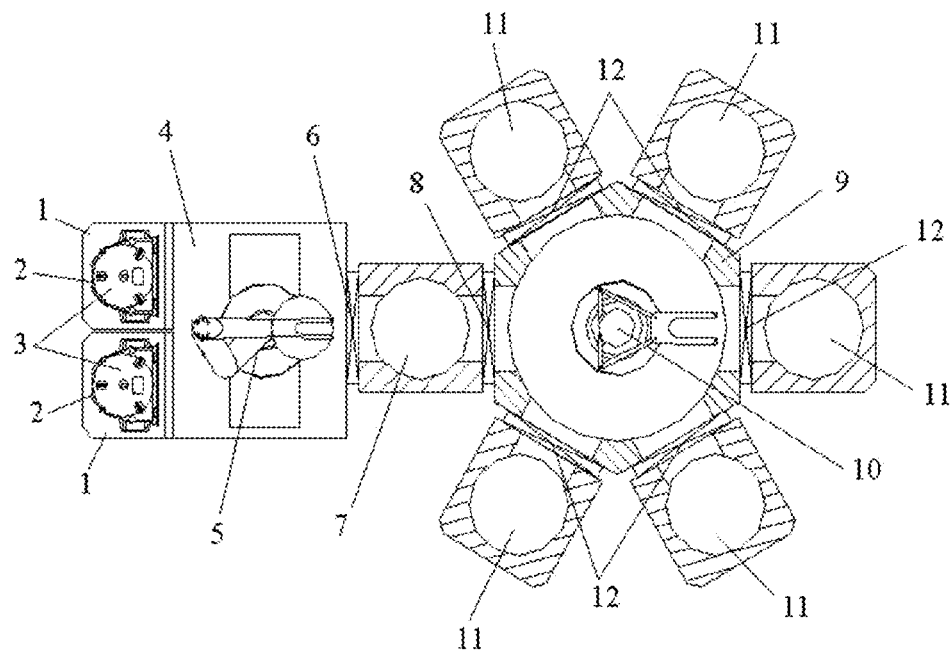
FIG. 1 is a top view of an object processing tool according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the following figures various slit valves are shown. All of these slit valves are illustrated as having a first slit valve portion that is static and a second slit valve portion that moves in relation to the first slit valve portion. In all the following figures the first slit valve portion is shown as including pressurized gas and vacuum gas openings. It is noted that the pressurized gas openings and, additionally or alternatively, the vacuum gas openings can be included in the second slit valve portion or in both slit vale portions.

The first slit valve portion may be integrated with a sidewall of a chamber, may be coupled to the sidewall of the chamber or may form a part of the sidewall of the chamber.

FIG. 1 is a top view of an object processing tool 20 according to an embodiment of the invention.

The object processing tool 20 includes (a) a load port 1 in which there are cassettes 2 with substrates 3, (b) a factory interface 4 with an external robot 5, (c) a load lock 7, (d) an external slit valve 6, (e) an internal single slit valve 8, (f) a transfer chamber 9 that includes an internal robot 10, (g) multiple process chambers 11, and (h) internal dual slit valves 12.

The internal single slit valve 8 provides an interface between the load lock 7 and the transfer chamber 9. Internal dual slit valves 12 provide interfaces between the transfer chamber 9 and the process chambers 11.

The operating conditions of the different slit calves differ from each other, and this affects their design.

The first type of slit valve is the external slit valve 6 that operates in atmospheric environment and seals the load lock 7 where may be either slight overpressure or vacuum. Sealing the transfer chamber 9 is required when the pumping process and vacuum environment exists in the transfer chamber. In this condition the force between atmospheric pressure and vacuum is pressing the sealing plate to the valve body and air bearing contra force is balancing this force.

The second type of slit valve is internal single slit valve 8 that separates the load lock 7 and the transfer chamber 9 where there is always vacuum condition, so the sealing should be performed for two scenarios:
  a. The load lock 7 maintains an atmosphere pressure and the transfer chamber maintains vacuum.
  b. Both load lock 7 and transfer chamber 9 maintain vacuum.

In the first scenario the internal single slit valve 8 faces the same conditions as the external slit valve 6.

In the second scenario there is no force that presses the sealing plate to the valve housing—as there is no difference in the pressure level obtained on both sides of the slit valve. Accordingly—there should be provides a force for pressing the sealing plate towards the valve housing. This may achieved by applying a mechanical force.

In addition—there may be an additional difference that may be attributes to the need to maintain vacuum and a clean environment on both sides of the slit valve—so that any pressurized gas that is released to form the air bearing (or air cushion) should be pumped away.

The third type of slit valve is the internal dual slit valve 12, which operates always in vacuum-vacuum conditions—as vacuum is maintained within the transfer chamber 9 and within the process chambers 11.

External Slit Valve 6

The main operation condition of the external slit valve 6 is atmosphere-vacuum (the external slit valve 6 is exposed to an atmospheric pressure level from one side and to a vacuum pressure level on the other side, and it may include vacuum openings between an air bearing area and load lock 7.

Figure 2:
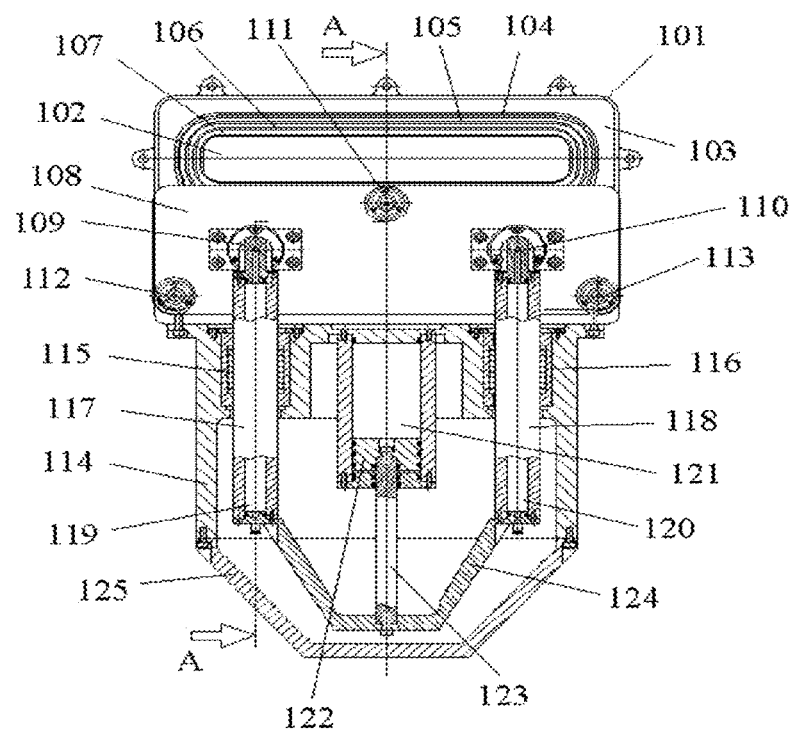
FIG. 2 is a schematic diagram of an external slit valve when the external slit valve is at the open position, according to an embodiment of the invention.

FIG. 2 is a schematic diagram of the external slit valve 6 when the external slit valve 6 is at the open position, according to an embodiment of the invention.

Figure 3:
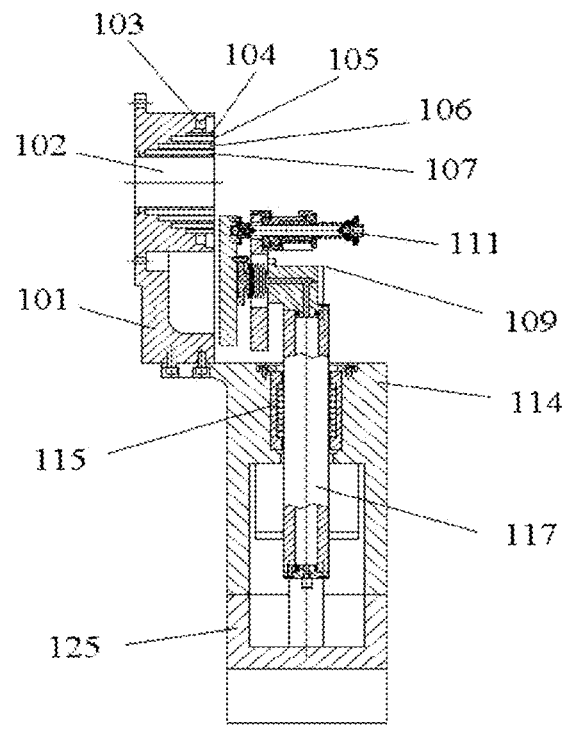
FIG. 3 is a cross sectional view of an external slit valve taken across a vertical plane denoted A-A in FIG. 2, according to an embodiment of the invention.

FIG. 3 is a cross sectional view of the external slit valve 6 taken across a vertical plane denoted A-A in FIG. 2, according to an embodiment of the invention.

Figure 4:
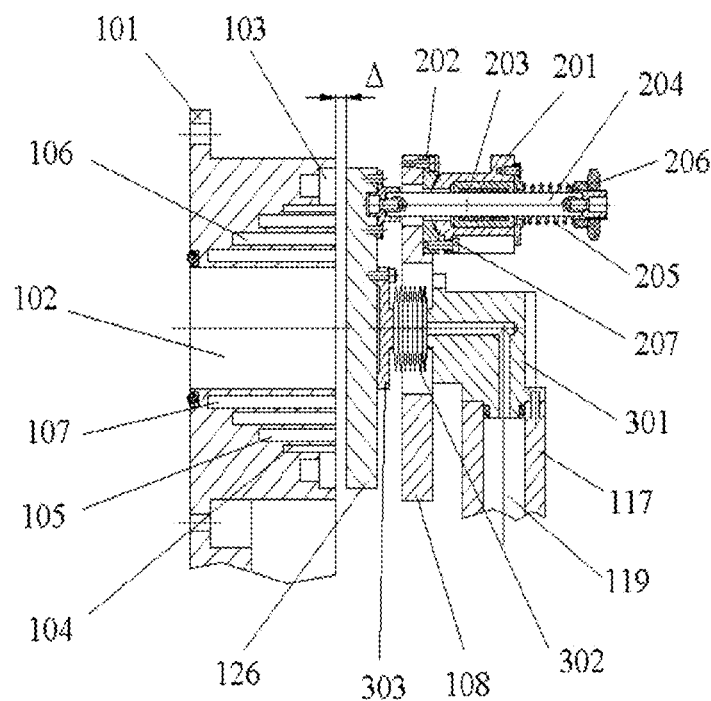
FIG. 4 is a magnified portion of the cross sectional view of an external slit valve taken across the vertical plane denoted A-A in FIG. 2, according to an embodiment of the invention.

FIG. 4 is a magnified portion of the cross sectional view of the external slit valve 6 taken across the vertical plane denoted A-A in FIG. 2, according to an embodiment of the invention.

External slit valve 6 may include a housing 101, a window 102 for transfer of substrates, an air bearing area 103, a groove 104 for providing pressurized gas of an atmospheric pressure 104 and three grooves 105, 106 and 107 for pumping vacuum.

The housing 101 may be integrated with a wall of the load lock 7 or may be coupled to the wall of the load lock 7. This housing 101 defined the window through which substrates can be transferred between the load lock 7 and the factory interface 4.

The three grooves 105, 106 and 107 can apply a differential pumping scheme in which the pressure levels decrease with the distance from groove 104.

On the base plate 108 two subsystems are mounted. A first subsystem may include two horizontal actuators 109 and 110 of the sealing plate 126.

A second subsystem provides a guiding mechanism for the sealing plate 126 and may include of one master slide 111 for example, slide bushing and two slave slides 112 and 113.

The actuator module of the base plate 108 may introduce a vertical motion between the window and the sealing plate 126. The actuator module may include a module housing 114, a guiding unit with one master slide 115 and one slave slide 116.

Two rods 117 and 118 have channels 119 and 120 in order to supply compressed gas to the two horizontal actuators 109 and 110 via a control solenoid valve.

A vertical pneumatic cylinder 121 with piston 122 and rod 123 may provide a vertical motion of the base plate 108. Yoke 124 synchronizes the vertical motion of two rods 117 and 118. Part 125 is cover of the actuator module of the base plate 108.

FIG. 4 is a cross sectional view of a portion of the external slit valve 6 of FIG. 2 where the base plate 108 is at an upper position and the sealing plate 126 is at the right end position, according to an embodiment of the invention.

FIG. 4 illustrates a gap (Δ) formed between housing 101 and the sealing plate 126. This gap can be about 5-7 mm and is too big for the formation of the air bearing.

The external slit valve 6 can be closed by performing the following steps (and the air bearing may be activated to output pressurized gas during the execution of the following stages):
  a. Elevating the base plate 108 by vertical pneumatic cylinder 121 with two guiding rods 117 and 118. The adjustment of upper position of the base plate 108 may be performed by hard stop (not shown). In this position the gap between housing 101 and the sealing plate 126 may be about 5-7 mm.
  b. After the vertical pneumatic cylinder 121 reach the upper position, the two horizontal actuators 109 and 110 are activated. Each horizontal actuator 109 and 110 has a bellows 302 which is mounted on the bellows actuator base 301. When the gap between the sealing plate 126 and housing 101 reaches a desired valve (which may be between 150 till 300 microns) the force balance between actuator force and force of two springs 205 is obtained.
  c. The vacuum seal does not operate with such gaps and there is a need to reduce the gap. This is achieved by introducing a pressure difference so that the load lock 7 and vacuum grooves 105, 106 and 107 are placed at a lower pressure level than the environment of the load lock 7. This can include introducing vacuum into the load lock 7—pumping gas from the load lock while maintaining the environment outside the sealing plate 126 at an atmospheric pressure level. At the end of this process the gap between the housing 101 and sealing plate 126 is small enough to enable the vacuum seal to operate. The gap Δ can be about 5-7 microns. At this condition there is provided a force balance between the force of bellows actuators 109 and 110, air bearing 103, vacuum force in the load lock 7 chamber and differential vacuum grooves 105, 106 and 107; and also force of the atmospheric pressure are settled.

The sliding subsystem of the sealing plate 126 may include a master slide 111 and two slave slides 112 and 113. Basically, the master slide 111 may include the slide housing 201, thrust bearing 202, slide bushing 203 and rod 204. Slide housing 201 and thrust bearing 202 form the spherical kinematic joint that allows reaching the high level parallelism around 3-4 microns between surfaces of the sealing plate 126 and housing 201. This adjustment should be performed at an initialization step.

Figure 5:
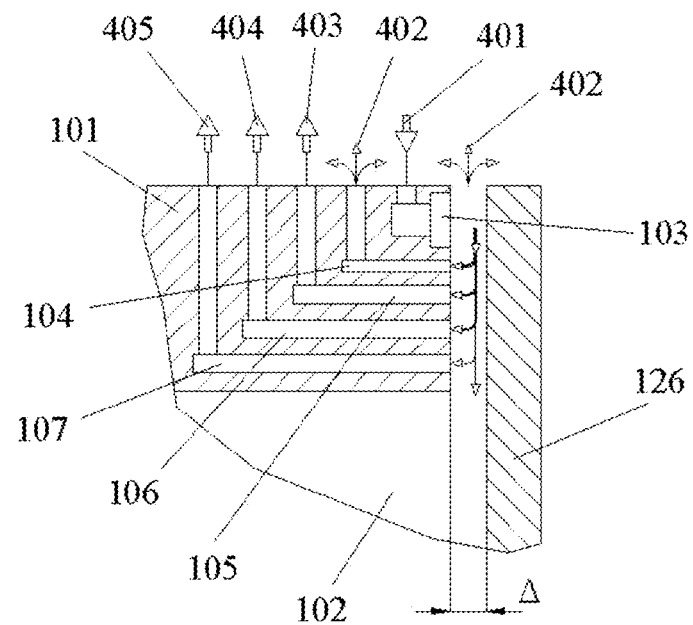
FIG. 5 is a cross sectional view of a portion of an external slit valve according to an embodiment of the invention.

FIG. 5 is a cross sectional view of a portion of the external slit valve according to an embodiment of the invention.

Each plenum, annular grooves 104, 105, 106 and 107 and its isolating land may act to remove residual pressurized gas from the air bearing annular groove 103 until the required level of isolation outside the vicinity of the slit valve is achieved.

Gas opening 402 is maintained at atmospheric pressure. Vacuum openings such as exhaust conduits 403, 404 and 405, which may be similar to the exhaust ports in the gas exhaust system disclosed in the commonly assigned U.S. Pat. No. 6,163,033, are coupled to each plenum to remove the residual gas. The conduits may be connected to vacuum pumps (not shown). The vacuum pumps may be operated separately, or under the control of the system controller. The necessary number of plenum stages depends upon the level of vacuum required and the pumping rate of the vacuum pumps in conjunction with the precision of the air bearing gap.

Figure 6:
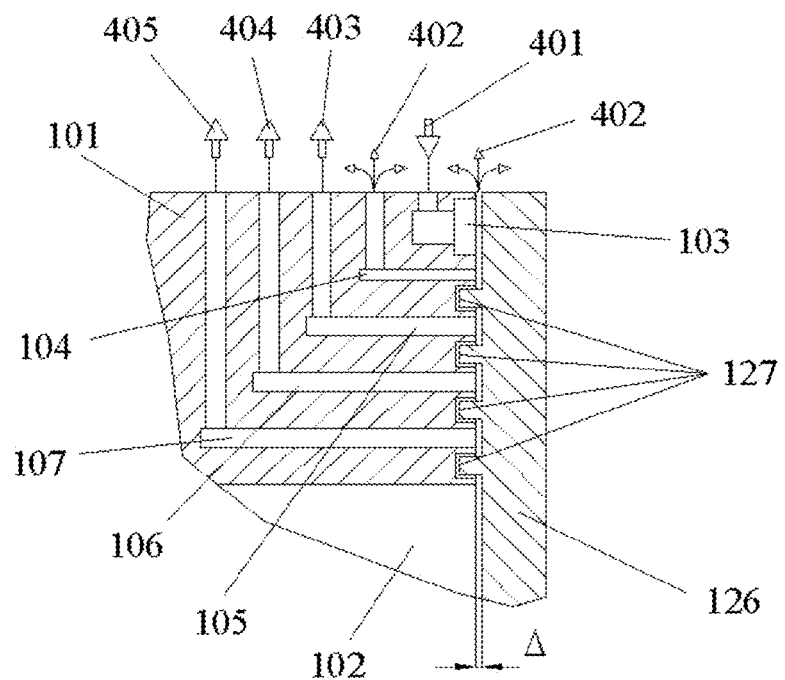
FIG. 6 is a cross sectional view of a portion of an external slit valve according to an embodiment of the invention.

FIG. 6 is a cross sectional view of a portion of the external slit valve according to an embodiment of the invention.

In this case the labyrinth seals 127 are situated between annular grooves 104, 105, 106 and 107. This configuration may reduce the amount of pressurized gas that may escape the vicinity of the gas and vacuum openings and may increase the vacuum level in the load lock 7.

Figure 7:
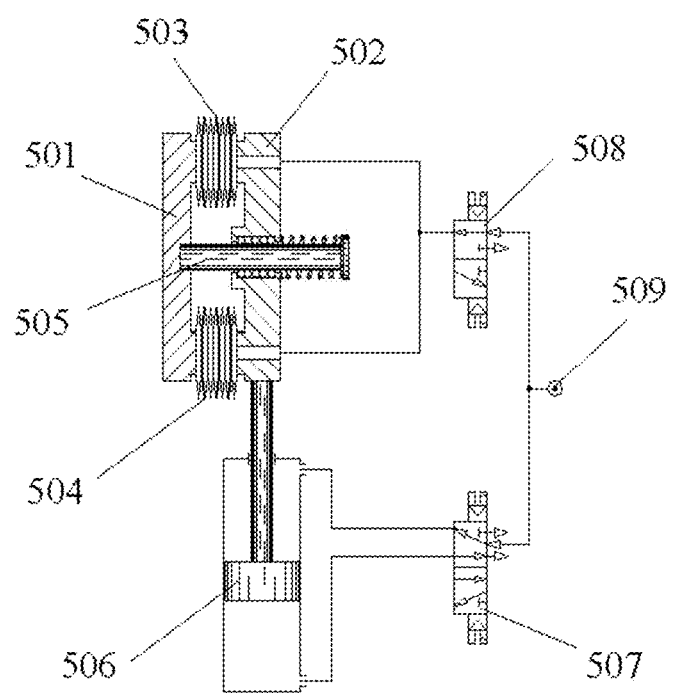
FIG. 7 is a schematic diagram of the pneumatic actuators according to various embodiments of the invention.

FIG. 7 is a schematic diagram of the pneumatic actuators according to various embodiments of the invention.

Two bellows actuators 503 and 504 are mounted on the base plate 502 and they move the sealing plate 501 in horizontal direction. Sliding unit 505 provides the precise motion. Pneumatic cylinder 506 moves the base plate 502 with all its components in vertical direction. Solenoid valve 507 5/2-way type is intended for control of the pneumatic cylinder 506 and 3/2-way solenoid valve 508 may be used for control of two bellows actuators 503 and 504 which operate together. Unit 509 is compressed air service unit The parallelism between the sealing plate 126 and housing 101 may require an adjustment process. The value of the parallelism should be around 3-4 microns at that the flatness of corresponding surfaces of the plate and housing is about 1-2 microns. In this case the material of the sealing plate 126 may be ceramic (for example, alumina) and housing 101 may be made of aluminum (for example, AL6061T651).

The adjustment process may include the following steps:
a. Move the sealing plate 126 in the upper position where the gap (of certain value) between sealing plate 126 and housing 101 is in the range of 5-7 mm.
b. Release the three screws 207 on each slide bushing 203 that clamp the spherical kinematic joints.
c. Move the sealing plate 126 to the tight contact with housing 101 using two pneumatic bellows actuators 503 and 504.
d. Tighten all screws 207 on each slide bushing 203 that perform the clamping of the three spherical kinematic joints between the slide housing 201 and the thrust bearing 202.
e. Return the sealing plate 126 at the position where the gap between sealing plate 126 and housing 101 is of the certain value.
f. Check the parallelism between sealing plate 126 and housing 101, which should be around 3-4 microns. For this connect two pneumatic bellows actuators with atmospheric pressure.
g. Repeat the above procedure if the parallelism between sealing plate 126 and housing 101 doesn't lie in the desired range.

Internal Single Slit Valve

The internal single slit valve and the internal dual slit valve may operate under vacuum-vacuum conditions in which both sides of these internal slit valves are at vacuum—as vacuum is maintained within the process chambers 11, the transfer chamber 9 and the load lock 7.

The positioning module of these internal slit valves and especially all moving parts of the positioning module are operating under vacuum and should be sealed by means of bellows, which ensures a good seal and prevent contamination of the particles.

Figure 8:
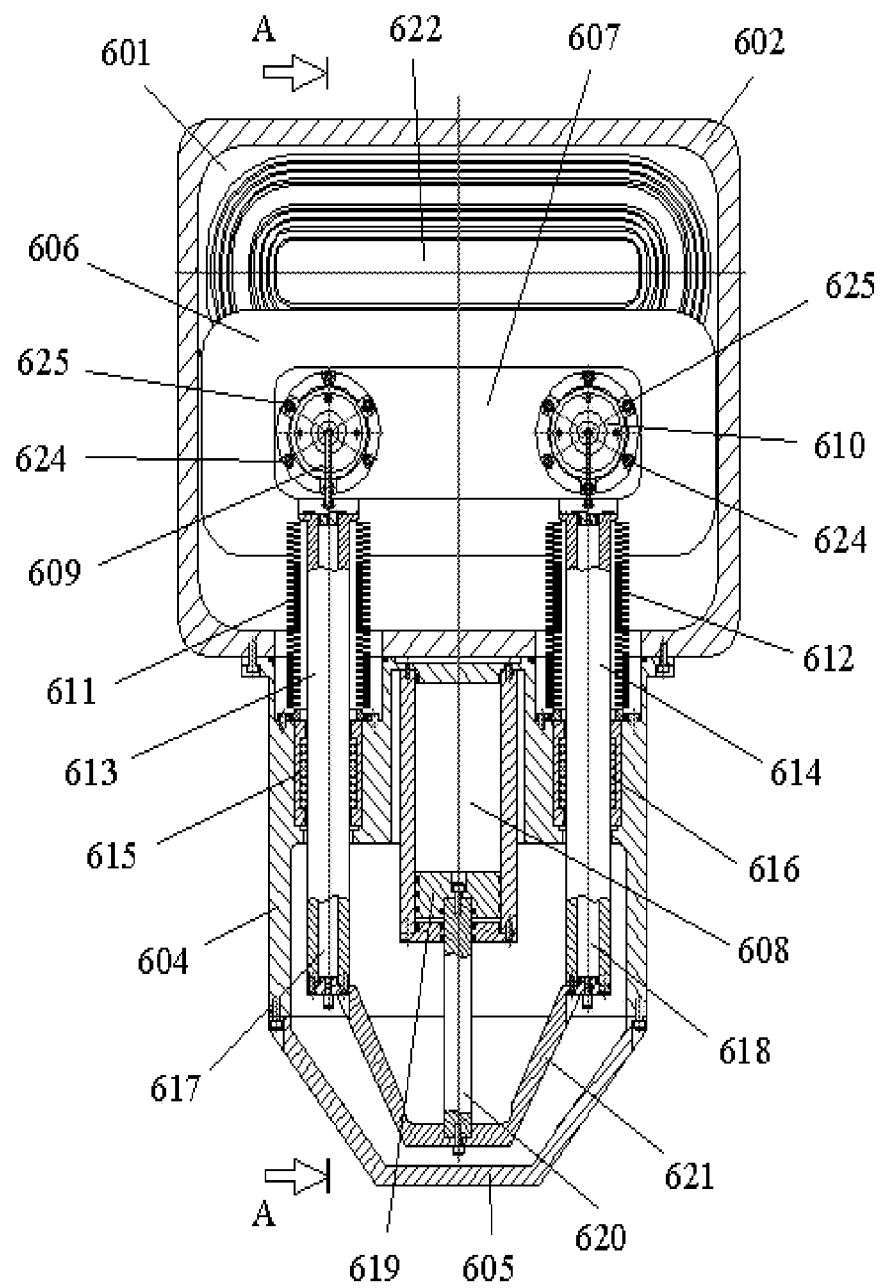
FIG. 8 illustrates an internal single slit valve when the sealing plate of the internal single slit valve is at the open position, according to an embodiment of the invention.

FIG. 8 illustrates an internal single slit valve 8 when the sealing plate of the internal single slit valve 8 is at the open position, according to an embodiment of the invention.

Figure 9:
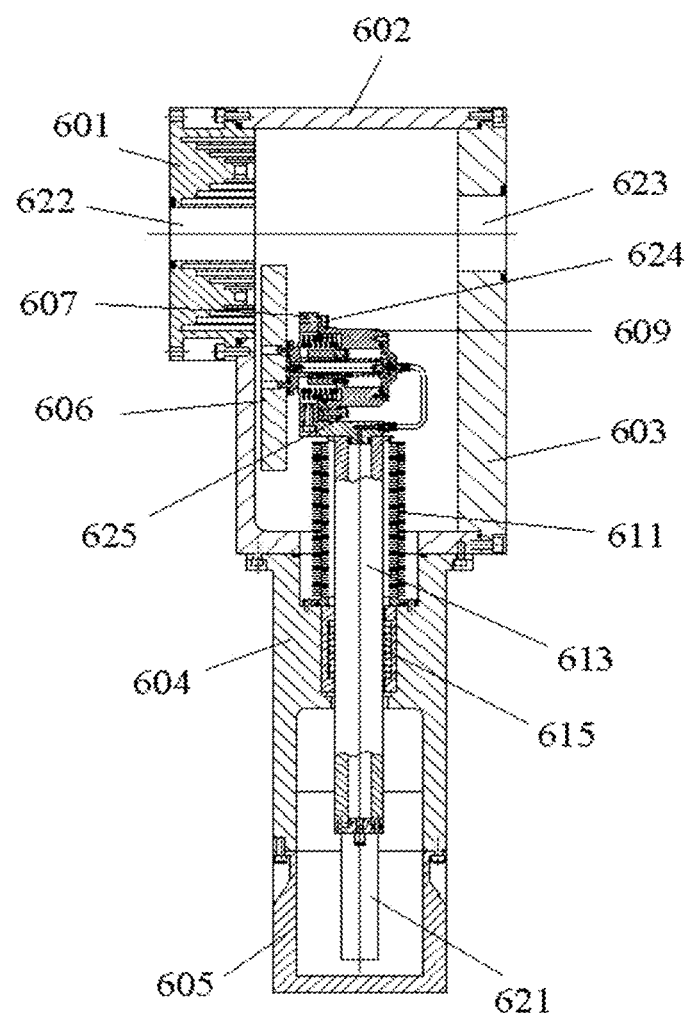
FIG. 9 is a cross sectional view of an internal single slit valve along vertical plane A-A of FIG. 8, according to an embodiment of the invention.

FIG. 9 is a cross sectional view of the internal single slit valve 8 along vertical plane A-A of FIG. 8, according to an embodiment of the invention.

Figure 10:
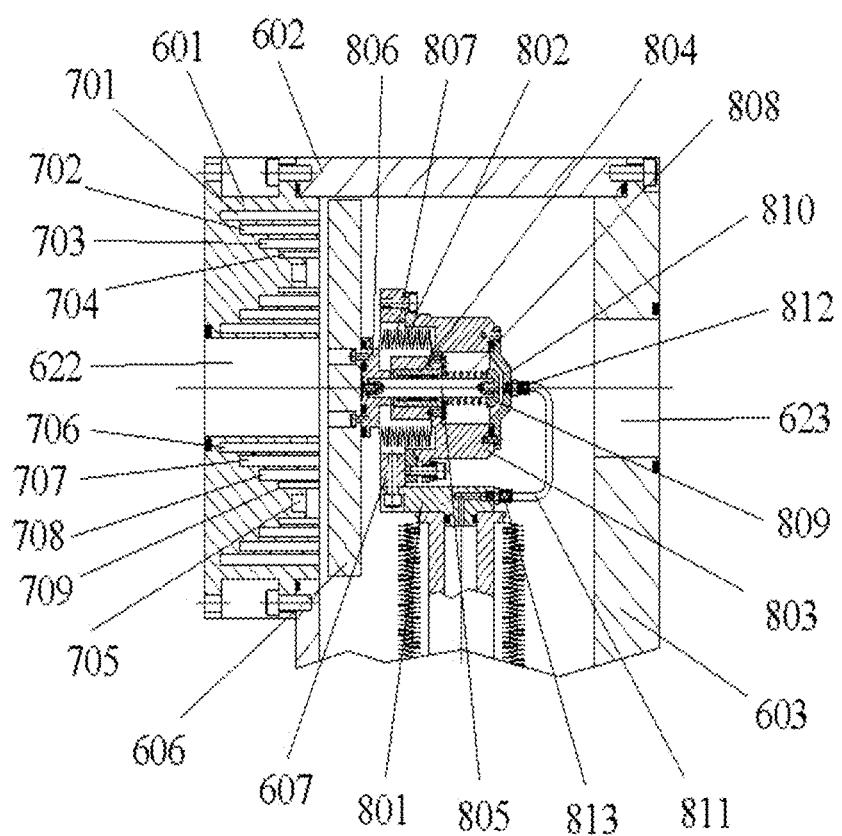
FIG. 10 is a magnified cross sectional view of a portion of an internal single slit valve taken along vertical plane A-A of FIG. 8, according to an embodiment of the invention.

FIG. 10 is a magnified cross sectional view of a portion of the internal single slit valve taken along vertical plane A-A of FIG. 8, according to an embodiment of the invention.

The internal single slit valve 8 may include a rear interface plate 601, a housing 602 and a front interface plate 603. Two windows 622 and 623 are intended for transfer of substrates. The actuating module of the vertical motion has body 604 and cover 605.

The sealing plate 606 moves in a horizontal direction by two bellows pneumatic actuators 609 and 610 that are mounted on the base plate 607. Two bellows 611 and 612 are sealed by two rods 613 and 614. These rods have channels 617 and 618 in order to supply compressed air to the two actuators 609 and 610 via a control solenoid valve not shown here.

The guiding unit of the valve vertical motion may include of a master slide 615 and one slave slide 616. Pneumatic cylinder 608 with piston 619 and rod 620 provides the vertical motion of the base plate 607. Yoke 621 synchronizes the vertical motion of two rods 613 and 614. Part 605 is a cover of the vertical actuator module.

FIG. 10 is a cross section view of a portion of the internal single slit valve 8 where the base plate 607 is on upper position and the sealing plate 606 is on the right end position according to an embodiment of the invention. In this case the gap between rear interface plate 601 and the sealing plate 606 is in the range of 5-7 mm.

Two pneumatic actuators 609 and 610 may provide the horizontal motion of the sealing plate 606. Each actuator may include a base 801, a housing 803, and bellows 807.

The sliding subsystem of the each horizontal actuator may include slide 804, slide rod 805 and opposing spring 808. Slide 804 is mounted into actuator housing 802 and slide rod 805 is installed on the rod holder 806 that is mounted on the sealing plate 606.

The opposing spring 808 is mounted around the slide rod 805 between slide housing 802 and spring support 809. The sliding subsystem is installed within the horizontal pneumatic actuator that provides the full protection from the particle contaminations.

Compressed gas is supplied to the horizontal pneumatic actuator via PTFE Teflon flexible tube 811 and two hose nipples. First nipple is mounted on the actuator cover 810 and second one is installed on the base 801.

Each pneumatic actuator may include the spherical kinematic joint between thrust bearing plate 802 and housing 803. The thrust bearing plate 802 is connected to the base plate 607 by four screws 624, and the slide housing 803 is connected to the thrust bearing plate 802 by fore screws 625 that have the spherical washers. Such design allows reaching the high level parallelism around 1-3 microns between surfaces of the sealing plate 606 and the rear interface plate 601. This adjustment should be performed at an initialization step.

FIGS. 9 and 10 are schematic diagrams of the air bearing and differential vacuum seal portion according to various embodiment of the invention.

Basically, such internal slit valve has two differential vacuum seal portions that are built around the air bearing area 705. Each plenum, annular grooves 701, 702, 703, 704, 706, 707, 708 and 709 and its isolating land act to remove residual gas from the air bearing annular groove 705 until the required level of isolation is achieved at the seal interface here the grooves 704 and 709 are the atmospheric pressure grooves. Exhaust conduits 701, 702, 703, 706, 707 and 708 which may be similar to the exhaust ports in the gas exhaust system disclosed in the commonly assigned U.S. Pat. No. 6,163,033, are coupled to each plenum to remove the residual gas. The conduits are connected to vacuum pumps not shown.

The vacuum pumps may be operated separately, or under the control of the system controller. The necessary number of plenum stages depends upon the level of vacuum required and the pumping rate of the vacuum pumps in conjunction with the precision of the air bearing gap.

The slit valve can be closed by performing the following steps:
 a. Initial conditions are the following: air bearing is disconnected from the source of compressed air, both the atmospheric channel groove 704 and 709 blocked, and all another annular grooves are connected to the vacuum pumps.
 b. Elevating the base plate 607 and sealing plate 606 by pneumatic cylinder 608 with two guiding rods 613 and 614. The adjustment of upper position of the sealing plate 606 is performed by hard stop not shown. In this position the gap between rear interface plate 601 and the sealing plate 606 is about 5-7 mm.
 c. After the sealing plate 606 reaches the upper position two horizontal motion pneumatic actuators 609 and 610 are activated. Each bellows is expanded and moves the sealing plate 606 towards to rear interface plate 601. When the gap between sealing plate 606 and rear interface plate 601 reaches a desired value, which may be between 150 till 300 microns, the force balance between actuator force and force of spring 808 is got. The adjustment can be performed at an initialization step by changing of the pressure level of the compressed air.
 d. At the final phase the air bearing 705 is connected to the compressed air source, two grooves 704 and 709 are connected to the atmosphere. This lead to a new force balance between two opposing springs 808, air bearing 705 and two pneumatic actuators 609 and 610. In this case, the gap between sealing plate 606 and rear interface plate 601 is about 4-7 microns.

Adjustment procedure of the parallelism between sealing plate and housing may be similar to that applied for the external slit valve.

Internal Dual Slit Valve

According to an embodiment of the invention there may be provided a dual slit valve that may be operative to selectively seal two windows formed in two different sidewalls of different chambers. Thus, a first window may be formed in an external sidewall of a transfer chamber and a parallel window may be formed in an internal sidewall of a process chamber. In this case a dual slit valve can be arranged to seal both windows, one window at a time to leave both windows open.

When positioning a dual slit valve between the transfer chamber and the process chamber cross contamination should be taken into account and there is a need to prevent contamination from the process chamber from entering the transfer chamber and to prevent contamination from the transfer chamber from entering the process chamber.

Figure 11:
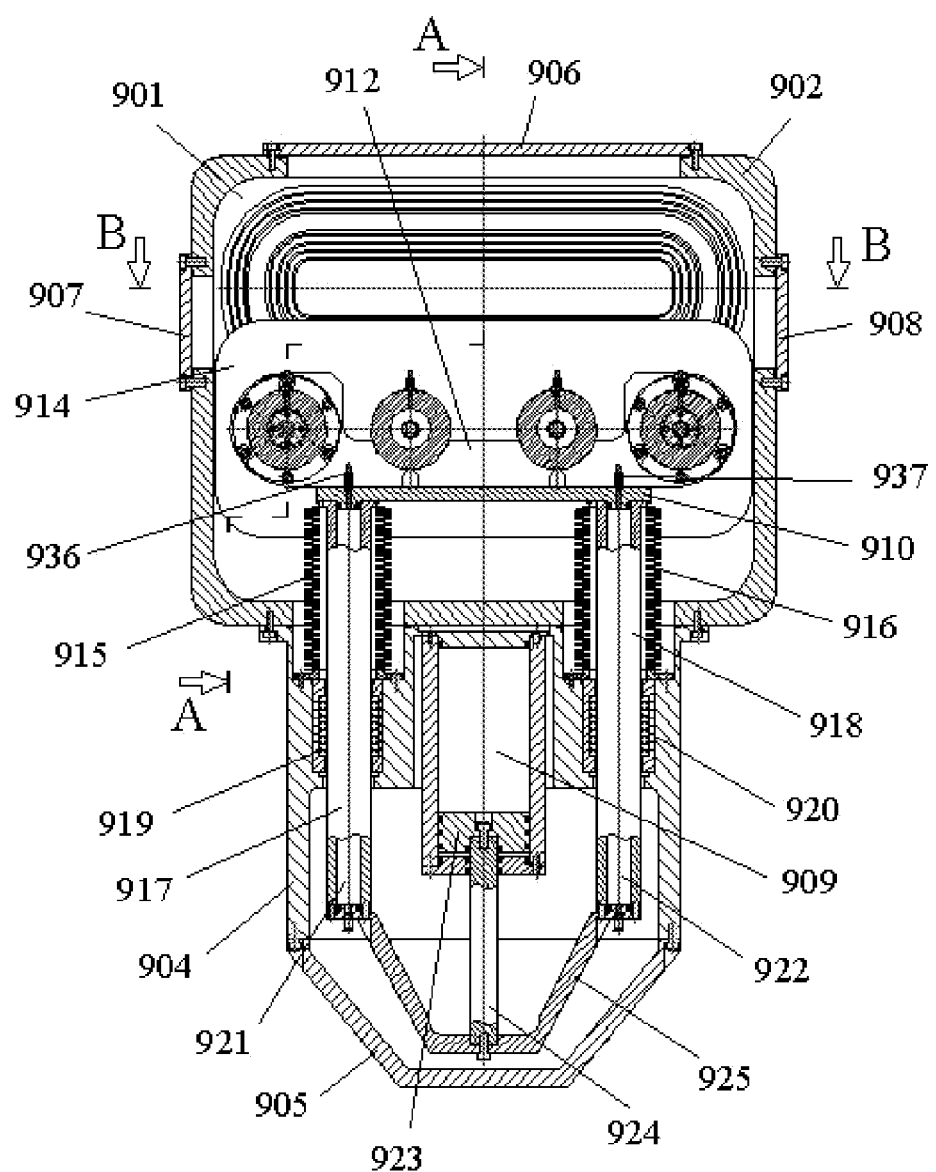
FIG. 11 is a front view of a portion of an internal dual slit valve according to an embodiment of the invention.

FIG. 11 is a front view of a portion of the internal dual slit valve according to an embodiment of the invention.

Figure 12:
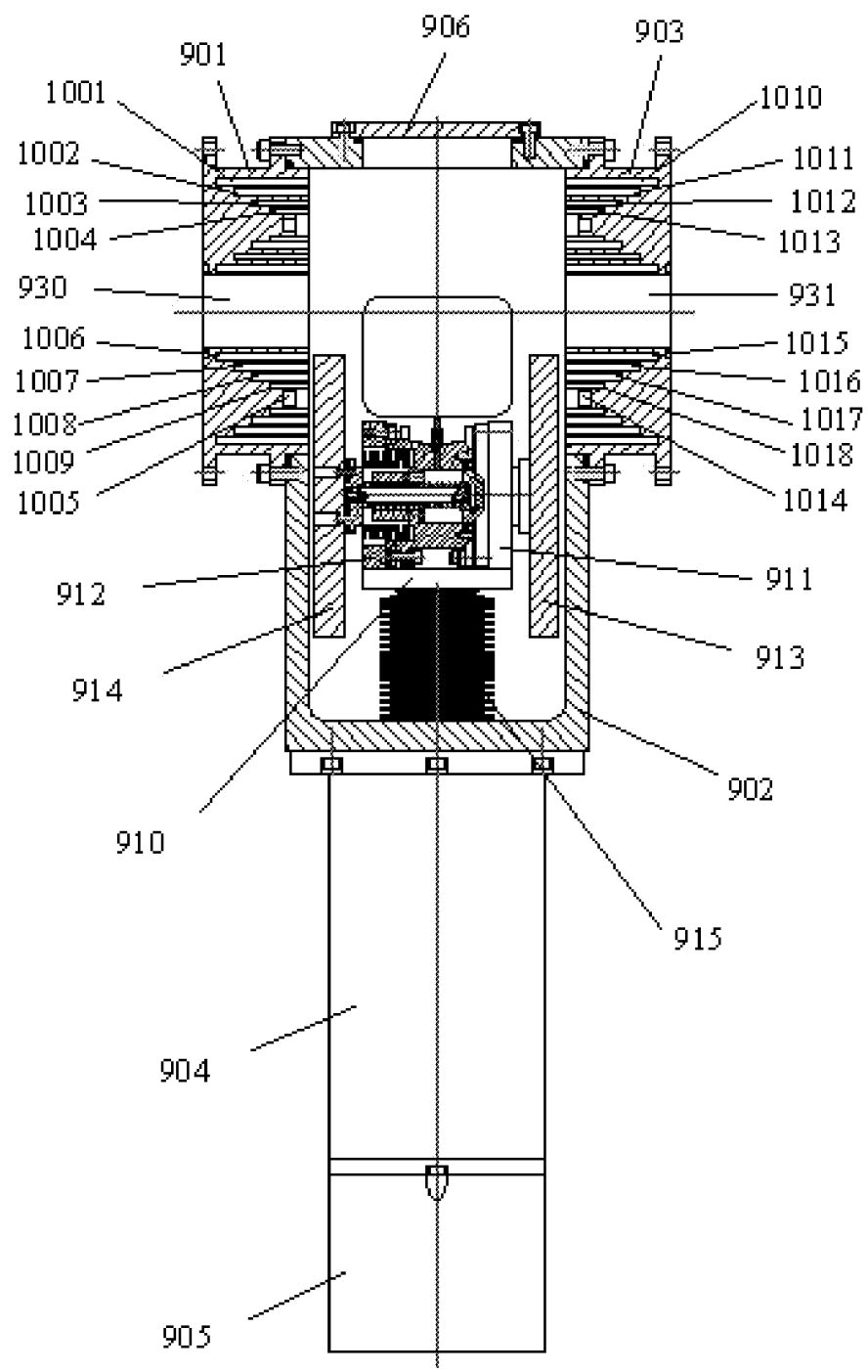
FIG. 12 is a cross sectional view of a portion of an internal dual slit valve taken along a vertical plane denoted A-A in FIG. 11 according to an embodiment of the invention.

FIG. 12 is a cross sectional view of the portion of the internal dual slit valve taken along a vertical plane denoted A-A in FIG. 11 according to an embodiment of the invention.

Figure 13:
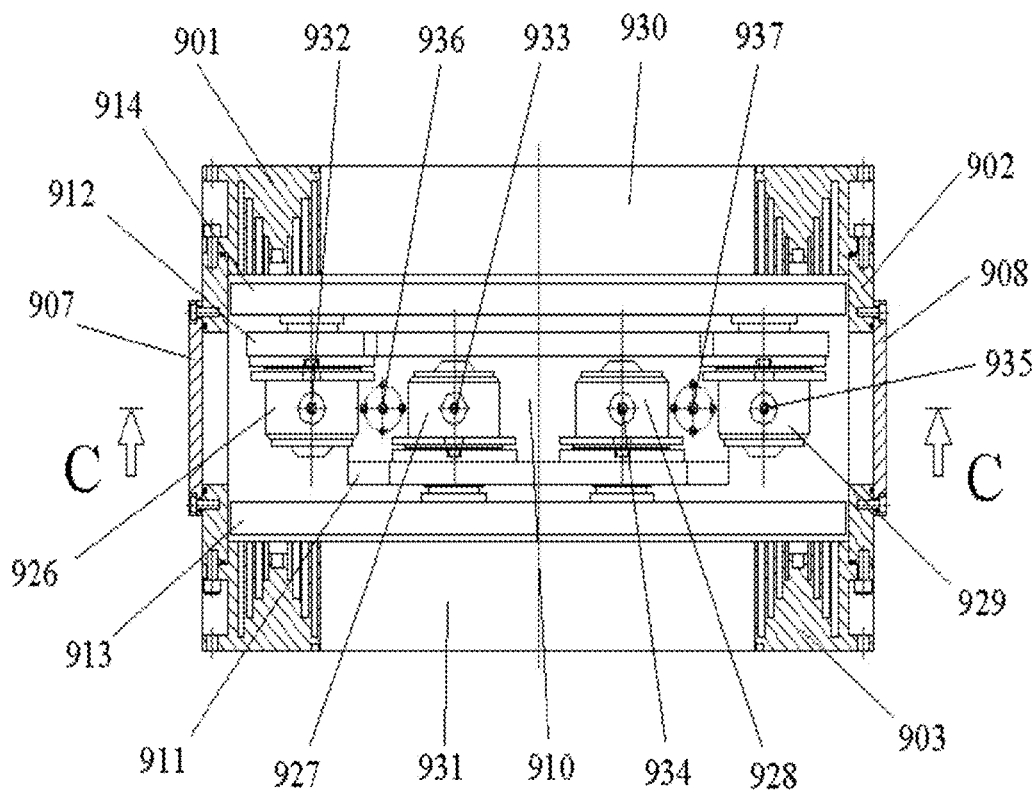
FIG. 13 is a cross sectional view of the portion of an internal dual slit valve taken along a horizontal plane denoted B-B in FIG. 11 according to an embodiment of the invention.

FIG. 13 is a cross sectional view of the portion of the internal dual slit valve taken along a horizontal plane denoted B-B in FIG. 11 according to an embodiment of the invention.

Figure 14:
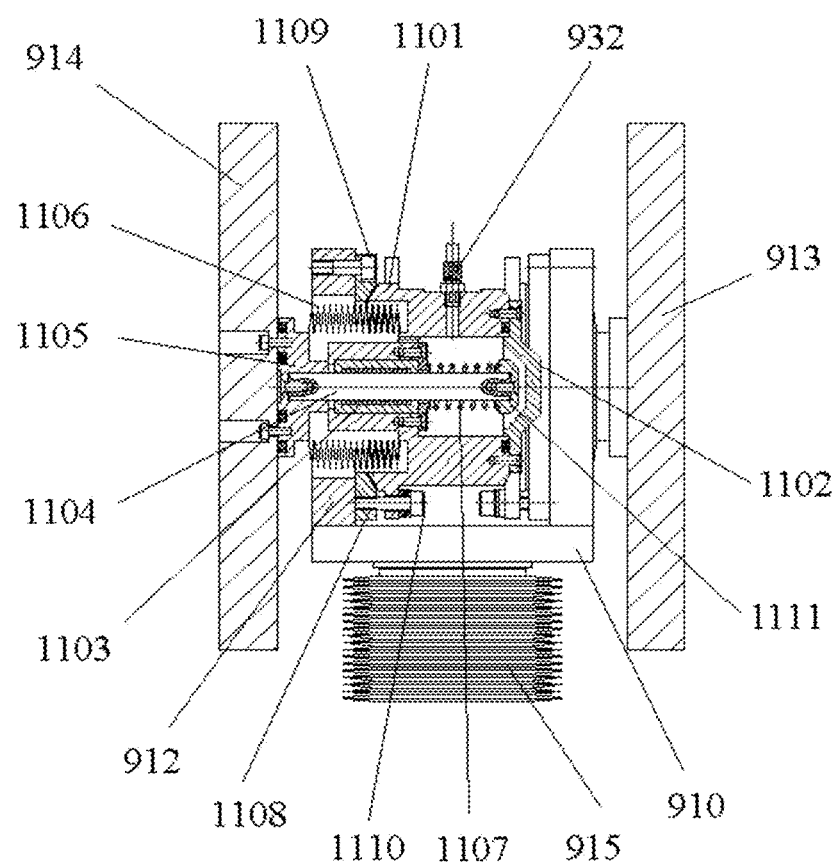
FIG. 14 is a magnified portion of the cross sectional view of an internal dual slit valve taken along the vertical plane denoted A-A in FIG. 11 according to an embodiment of the invention.

FIG. 14 is a magnified portion of the cross sectional view of the internal dual slit valve taken along the vertical plane denoted A-A in FIG. 11 according to an embodiment of the invention.

The internal dual slit valve may include a rear interface plate 901, housing 902 and front interface plate 903. The actuating module of the vertical motion has body 904 and cover 905. Three covers 906, 907 and 908 are intended to adjustment and service of two sealing plates 913 and 914. The sealing plate 914 moves in a horizontal direction by two bellows pneumatic actuators 926 and 929 that are mounted on the base plate 912. The second sealing plate 913 moves in a horizontal direction by two bellows pneumatic actuators 927 and 928 that are mounted on the base plate 911.

Both the base plate 911 and 912 are mounted on the base 910 that moves in vertical direction by vertical actuating module that contains two bellows 915 and 916, which are sealed two rods 917 and 918. These rods have channels 921 and 922 in order to supply compressed air to the four horizontal actuators.

The guiding unit of the valve vertical motion may include of one master slide 919 and one slave slide 920 for example, top ball bushing. Pneumatic cylinder 909 with piston 923 and rod 924 provide the vertical motion of the base 910. Yoke 925 synchronizes the vertical motion of two rods 917 and 918. Part 905 is cover of the vertical actuator module.

Two pneumatic actuators 926 and 929 provide the horizontal motion of the sealing plate 914. Another two pneumatic actuators 927 and 928 provide the horizontal motion of the sealing plate 913. Each pair of actuators is controlled by solenoid valve not shown.

Compressed air is supplied to the horizontal pneumatic actuators via PTFE Teflon flexible tube (not shown). Two nipples 932 and 935 are connected to the nipple 936, and two other nipples 933 and 934 are connected to the nipple 937.

The each pneumatic actuator contains the spherical kinematic joint between thrust bearing plate 1108 and housing 1101. The thrust bearing plate 1108 is connected to the base plate 912 by four screws 1109, and the slide housing 1101 is connected to the thrust bearing plate 1108 by four screws 1110 that have the spherical washers. Such design allows reaching the high level parallelism around 1-3 microns between surfaces of the sealing plate 914 and the rear interface plate 901. This adjustment should be performed at an initialization step.

Each actuator may include of the housing 1101, cover 1102, and bellows 1106. The sliding subsystem of the each horizontal actuator may include slide 1103, slide rod 1104 and opposing spring 1107. Slide 1103 is mounted into actuator housing 1101 and slide rod 1104 is installed on the rod holder 1105 that is mounted on the sealing plate 914. The opposing spring 1107 is mounted around the slide rod 1104 between housing 1101 and spring support 1111. The sliding subsystem is installed within the horizontal pneumatic actuator that provides the full protection from the particle contaminations.

As shown in FIG. 12 and FIG. 13 the rear interface plate 901 and the front interface plate 903 has two differential vacuum seal portions that are built around the air bearing area 1005 and 1014. The rear interface plate 901 has plenum, annular grooves 1001, 1002, 1003, 1004, 1006, 1007, 1008 and 1009. The front interface plate 903 has plenum, annular grooves 1010, 1011, 1012, 1013, 1015, 1016, 1017 and 1018. Annular groves and their isolating lands act to remove residual gas from the air bearing annular grooves until the required level of isolation. Exhaust conduits which may be similar to the exhaust ports in the gas exhaust system disclosed in the commonly assigned U.S. Pat. No. 6,163,033, are coupled to each plenum to remove the residual gas. The conduits are connected to vacuum pumps not shown.

The vacuum pumps may be operated separately, or under the control of the system controller. The necessary number of plenum stages depends upon the level of vacuum required and the pumping rate of the vacuum pumps in conjunction with the precision of the air bearing gap.

The dual slit valve can be closed by performing the following steps same to the type A slit valve:
a. Initial conditions are the following: air bearing is disconnected from the source of compressed air, the atmospheric channels grooves 1004, 1009, 1013 and 1018 blocked, and all another annular grooves are connected to the vacuum pumps.
b. Elevating the base 910 and two sealing plates 913 and 914 by pneumatic cylinder 909 with two guiding rods 917 and 918. The adjustment of upper position of the sealing plates 913 and 914 is performed by hard stop not shown. In this position the gap between rear interface plate 901 and the sealing plate 914, and between front interface plate 903 and the sealing plate 913 is in the range between 5 and 7 mm.
c. After the sealing plates reach the upper position four horizontal motion pneumatic actuators 926, 927, 928 and 929 are activated. Each bellows is expanded and moves two sealing plates towards to interface plates. When the gap between each sealing plate and its interface plate reaches a desired value, which may be between 150 till 300 microns, the force balance between actuator force and force of opposing springs is got. The adjustment can be performed at an initialization step by changing of the pressure level of the compressed air.
d. At the final phase the air bearings 1005 and 1014 are connected to the compressed air source, four grooves 1004, 1009, 1013 and 1018 are connected to the atmosphere. This lead to a new force balance between pair of opposing springs, air bearing and pair of pneumatic actuators. In this case, the gap between each sealing plate and corresponding interface plate is about 4-7 microns.

Basically, in the normal sealing mode the valve internal volume may be connected to the standalone vacuum pump or to the vacuum pump of the groove 1001 or 1010. In the cases where the ventilation procedure performs in the process chamber or in the transfer chamber the valve internal volume is connected to the ventilated chamber. In this case, the valve operates as the single slit valve slit valve type "A".

Adjustment procedure of the parallelism between sealing plate and housing is similar to that of the external slit valve.

Figure 15:
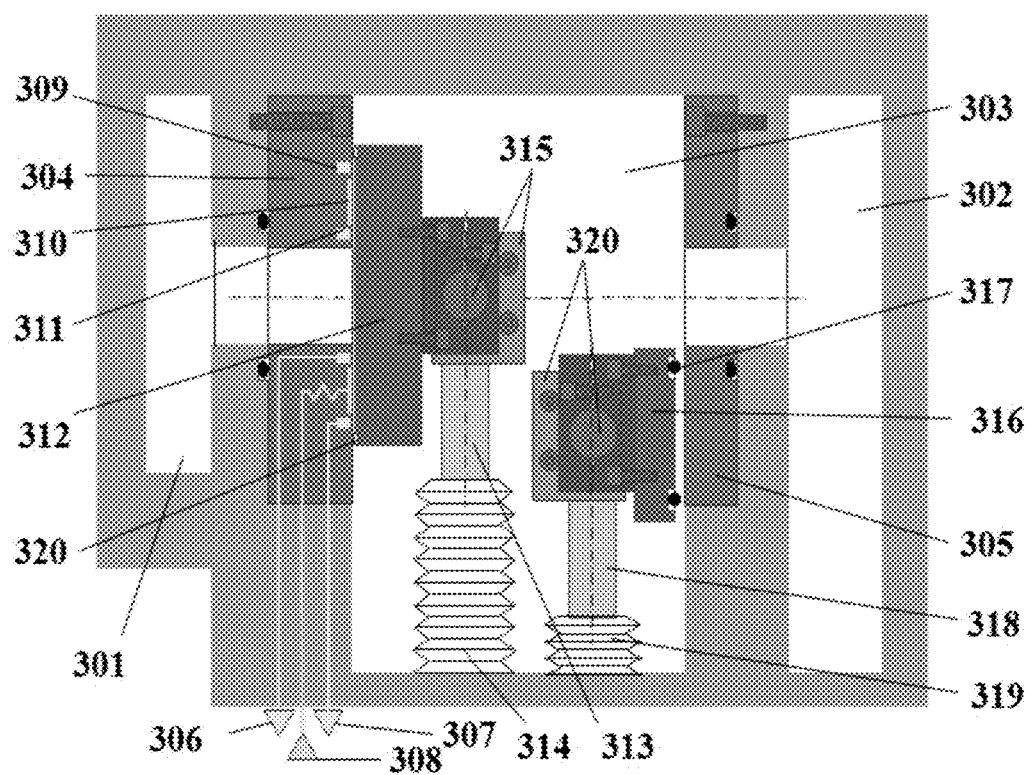
FIG. 15 is a cross sectional view of the portion of the internal dual slit valve taken along a horizontal plane according to another embodiment of the invention.

FIG. 15 illustrates a cross sectional view of a dual slit valve according to another embodiment in the invention.

The internal dual slit valve is mounted between the process chamber 1301 and the transfer chamber 1302. It situates within an intermediate chamber 1303.

The main valve has the insert 1304 for providing of the pressurized gas bearing and differential pumping channels. Pressurized gas bearing area 1310 and two grooves of the differential pumping 1309 and 1311 are connected to the compressed gas line 1308 and two vacuum lines 1306 and 1307 accordingly. The front surface of the sealing plate 1312 and also front surface of the insert 1304 must have high level of flatness 1 around 1-2 microns. The sealing plate 1312 has four corner bumpers 1320 on its front surface area. There are contact pads at all four corners that provide low contact area in the case the slit valve insert 1304 is not coplanar to slit valve sealing plate 1312. Such contacts would only be made before gas bearing pressure builds and sealing plate 1312 floats.

Floating gap between the insert 1304 and sealing plate 1312 is in the range from 4 to 10 microns. Mounting gimbals 1315 have two axis of rotation to enable planarity of the sealing plate 1312 to slit valve insert 1304. "L" motion actuator shaft 1313 has two axis linear motions: first one is vertical to raise or lower the sealing plate 1312, and second motion is horizontal to seal the valve opening. The bellows 1314 is sealed the actuator shaft 1313.

The service valve may include of insert 1305 with front side sealing surface, sealing plate 1316 with "O"-ring 1317.

Mounting gimbals 1320 have two axis of rotation to enable planarity of the sealing plate 1316 to insert 1305. "L" motion actuator shaft 1318 has two axis linear motions: first one is vertical to raise or lower the sealing plate 1316, and second motion is horizontal to seal the valve opening. The bellows 1319 is sealed the actuator shaft 1318.

The service valve may be only closed when the process 1301 or transfer 1302 chamber is vented.

The service valve may be used to eliminate the requirement for the primary valve between the process chamber and transfer chamber to seal against the full pressure differential of atmosphere. Eliminating this requirement significantly reduces the force the valve needs to provide and therefore the pressurized gas level.

The required force may drop by a factor of around 1000.

As the pressurized gas levels are reduced, the leak rate of the pressurized bearing gas into the vacuum chambers is also reduced. This enables the valve to have a very low leak rate even with only 1 simple stage of differential vacuum pumping. Meeting the leak rate requirement with 1 stage of differential pumping would be preferred to a 2 or 3 stage differential pumping solution from size and cost of pumping basis.

The dual slit valve may provide a double sealing area two sealing plate provides "zero" cross contamination property and provides a simple and a reliable seal during vented procedure of the process or transfer chamber.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A slit valve comprising:
   a first slit valve portion having a first window therethrough, the first window permitting passage of an object therethrough; wherein the first window is surrounded by a first area of the first slit valve portion;
   a second slit valve portion comprising a first sealing element and a first positioning module; wherein the first positioning module is arranged to move the first sealing element in relation to the first window;
   wherein at least one slit valve portion of the first and second slit valve portions comprises at least one first gas opening for emitting pressurized gas so as to assist in a creation of a first gas cushion between the first area and the first sealing element when the first sealing element is placed adjacent to the first window thus creating a seal between the first and second slit valve portions; and
   wherein one or more slit valve portions of the first and second slit valve portions comprise a first group and a second group of first vacuum openings for sucking at least a portion of the pressurized gas so as to reduce a propagation of the pressurized gas outside a vicinity of the first and second slit valve portions; wherein the at least one first gas opening is positioned between the first and second groups of first vacuum openings and is surrounded by the first and second groups of first vacuum openings.

2. The slit valve according to claim 1 wherein the first group of first vacuum openings is positioned between the at least one first gas opening and the first window.

3. The slit valve according to claim 1 wherein one or more slit valve portions of the first and second slit valve portions comprises multiple first vacuum openings for applying a differential pressure sucking scheme for sucking at least a portion of the pressurized gas so as to assist in a prevention of a propagation of the pressurized gas outside a vicinity of the first and second slit valve portions.

4. The slit valve according to claim 1 wherein the first sealing plate comprises the at least one first gas opening for emitting pressurized gas.

5. The slit valve according to claim 1 wherein the at least one first gas opening comprises a first gas groove that surrounds the window.

6. The slit valve according to claim 1 wherein the at least one first gas opening comprises multiple grooves that are spaced apart from each other, each groove surrounding the window.

7. The slit valve according to claim 1 further comprising sealing elements for sealing at least one portion of the first positioning module.

8. The slit valve according to claim 1 wherein the first slit valve portion is integrated with a sidewall of an object processing chamber.

9. The slit valve according to claim 1,
   wherein the first positioning module is configured to move the first sealing element to reduce a gap between the first area and the first sealing element; and
   wherein at least one slit valve portion of the first and second slit valve portions is configured to create a pressure difference between two sides of the first sealing element to further reduce the gap between the first area and the first sealing element.

10. The slit valve according to claim 9 wherein at least one slit valve portion of the first and second slit valve portions is configured to create the pressure difference between two sides of the first sealing element to further reduce the gap between the first area and the first sealing element to below 10 microns.

11. The slit valve according to claim 1 further comprising:
    a third slit valve portion having a second window therethrough, the second window is sized to permit passage of the object through the second window; wherein the second window is surrounded by a second area of the third slit valve portion; and
    a fourth slit valve portion that comprises a second sealing element and a second positioning module; wherein the second positioning module is arranged to move the second sealing element in relation to the second window;
    wherein the slit valve is arranged to seal the second window with the second sealing element.

12. The slit valve according to claim 11 wherein at least one slit valve portion of the third and fourth slit valve portions comprises at least one second gas opening for emitting another pressurized gas so as to assist in a creation of a second gas cushion between the second area and the second sealing element when the second sealing element is placed adjacent to the second window thus creating a seal between the third and fourth slit valve portions.

13. The slit valve according to claim 12 wherein one or more slit valve portions of the third and fourth slit valve portions comprises at least one second vacuum opening for sucking at least a portion of the other pressurized gas so as to assist in a prevention of a propagation of the other pressurized gas outside a vicinity of the second and third slit valve portions.

14. An object processing system comprising:
    a first chamber, comprising a first chamber wall defining a first window therethrough, the first window permitting passage of an object therethrough; wherein the first window is surrounded by a first area of the first chamber wall;
    a slit valve portion that comprises a first sealing element and a first positioning module; wherein the first positioning module is arranged to move the first sealing element in relation to the first window;
    wherein at least one of the first chamber wall and the slit valve portion comprises at least one first gas opening for emitting pressurized gas so as to assist in a creation of a first gas cushion between the first area and the first sealing element when the first sealing element is placed adjacent to the first window thus creating a seal between the first chamber wall and the slit valve portion; and
    wherein one of the slit valve portion or the first chamber wall comprises a first group and a second group of first vacuum openings for sucking at least a portion of the pressurized gas so as to reduce a propagation of the pressurized gas outside a vicinity of the first area of the first chamber wall; and wherein the at least one first gas opening is positioned between the first and second groups of first vacuum openings and is surrounded by the first and second groups of first vacuum openings.

15. The object processing system according to claim 14 comprising:
    a second chamber, comprising a second chamber wall defining a second window therethrough, the second window permitting passage of an object therethrough; wherein the second window is surrounded by a second area of the second chamber wall;
    another slit valve portion that comprises a second sealing element and a second positioning module; wherein the second positioning module is arranged to move the second sealing element in relation to the second window.

16. An object processing system comprising:

a first chamber including a first chamber wall defining a first window therethrough and a first area surrounding the first window, the first window permitting passage of an object through the first chamber wall;

a slit valve portion including a first sealing element sized and shaped to cover the first window and a first positioning module configured to move the first sealing element between a first position in which the first sealing element is displaced from the first window and a second position in which the first sealing element covers the first window enabling creation of a seal between the first chamber wall and the slit valve portion;

a vacuum pump;

a first annular gas channel formed in the first area and surrounding the first window, the first annular gas channel configured to emit pressurized gas into the first area to assist in creation of a first gas cushion between the first area and the first sealing element when the first sealing element is in the second position placed adjacent to the first window;

a first plurality of annular vacuum channels formed in the first area between the first window and the first annular gas channel, wherein each annular vacuum channel in the first plurality of annular vacuum channels surrounds the first window and is communicatively coupled to the vacuum pump for sucking at least a portion of the pressurized gas so as to reduce a propagation of the pressurized gas outside a vicinity of the first area; and a second plurality of annular vacuum channels formed in the first area, wherein each annular vacuum channel in the second plurality of annular vacuum channels surrounds the first annular gas channel and is communicatively coupled to the vacuum pump for sucking at least a portion of the pressurized gas so as to reduce a propagation of the pressurized gas outside the vicinity of the first area.

* * * * *